United States Patent [19]

Immel

[11] Patent Number: 5,623,367
[45] Date of Patent: Apr. 22, 1997

[54] EYEGUARD WITH AUTOMATIC DIAPHRAGM

[75] Inventor: John M. Immel, Richardson, Tex.

[73] Assignee: CMI Rubber Company, Inc., Garland, Tex.

[21] Appl. No.: 445,429

[22] Filed: May 19, 1995

[51] Int. Cl.$^6$ .................................................. G02B 21/00
[52] U.S. Cl. .......................... 359/600; 359/612; 359/739
[58] Field of Search .................................. 359/230, 236, 359/511, 512, 600, 611, 612, 738, 739

[56] References Cited

U.S. PATENT DOCUMENTS

| | | | |
|---|---|---|---|
| 3,594,062 | 7/1971 | Disley | 359/600 |
| 3,715,149 | 2/1973 | Freeland | 359/611 |
| 4,415,242 | 11/1983 | Major | 359/511 |
| 4,601,540 | 7/1986 | Karning et al. | 359/600 |
| 4,630,903 | 12/1986 | Jones | 359/600 |
| 5,408,359 | 4/1995 | Ferrett et al. | 359/600 |

*Primary Examiner*—Timothy P. Callahan
*Assistant Examiner*—Jeffrey Zweizig
*Attorney, Agent, or Firm*—Sidley & Austin

[57] ABSTRACT

An eyeguard for use on the eye-end of an optical instrument is provided having an instrument-end member adapted for connection to the optical instrument, an eye-end member adapted to interface with the periocular portion of the user's face, a hinge member disposed between the instrument-end and eye-end members having two flexible annular hinges, and a diaphragm comprising a plurality of segments attached to the interior of the hinge member between the annular hinges. The force of the user's eye pressing the eye-end member toward the instrument-end member deforms the annular hinges such that the normally closed diaphragm segments move to an open position, allowing light to pass through the eyeguard.

27 Claims, 4 Drawing Sheets

EYEGUARD WITH AUTOMATIC DIAPHRAGM

TECHNICAL FIELD OF THE INVENTION

The present invention relates to an eyeguard for positioning a user's eye in a working relationship with a telescope, binoculars or similar optical apparatus. More specifically, the present invention relates to an eyeguard having an internal diaphragm which is selectively opened by the action of the user pressing his eye against the eyeguard.

BACKGROUND OF THE INVENTION

It has long been known to enhance the comfort, convenience and utility of telescopes, binoculars and other such optical apparatus by providing these devices with an eyeguard to interface between the user's eye and the optical instrument. Eyeguards often take the form of a flexible rubber rim or cup extending from the eyepiece of the optical instrument. The eyeguard typically allows the user to comfortably position his eye against the instrument, assists the user in maintaining the proper eye relief distance, (i.e., the distance from the eye lens of the optical instrument to the user's eyeball) to provide the user with full field of view, and to shield the user's eye from ambient or reflected light which may distract from the image transmitted through the optical instrument.

The exposed lenses of optical instruments are often coated with specialized compounds ("optical coatings" ) which serve to improve the optical characteristics of the instrument. However, these optical coatings are frequently vulnerable to contamination or damage by airborne dirt, lint, dust, or oils, which may accumulate on the exposed lenses of the optical instrument and degrade the performance of the optical coatings. Conventional rim or cup type eyeguards provide little if any protection against such contamination of the lenses at the eye end of an optical instrument. Lens caps or covers which fit over the eyeguards are well known and provide good protection, however, the user must remember to put them in place after each use. A need exists, therefore, for an eyeguard which automatically protects the eye-end lenses of an optical instrument against dirt, dust or other airborne contaminants without conscious action by the user.

Enhanced vision devices are a type of optical instrument which are finding increasing use in military, law enforcement, and civilian applications. Enhanced vision devices employ light amplification, infrared or thermal imaging, or other technologies to provide visible images under low light or smoke-obscured conditions under which normal optical instruments would be ineffective. Examples of enhanced vision devices include night vision goggles, starlight scopes, and thermal sights. Such devices find a wide range of applications including personnel mounted night vision goggles, rifle mounted sniper scopes, and vehicle mounted thermal sites.

While the lenses of enhanced vision devices are subject to contamination by airborne particles just as are conventional optical instruments, the unique nature of some enhanced vision devices presents some additional problems. For example, some night vision devices employ photosensitive materials which may be damaged by exposure to high light levels. Such devices may be rendered temporarily unusable or even permanently damaged if sunlight or other strong lights are allowed to enter the instrument through the eye lens. Conventional rim or cup type eyeguards provide very limited protection against the unintended entry of light into the eye lens of an optical instrument. Some devices may be equipped with lens caps or covers which the user can place over the lens when the lens is not in use, thereby protecting it from the unintended entry of light. However, the effectiveness of such lens caps is completely dependent upon their consistent use by the user. It is difficult to ensure the consistent use of such caps in many situations such as combat or law enforcement situations. A need exists, therefore, for an eyeguard which prevents the entry of light into the eye lens of an optical instrument when it is not being used.

The use of enhanced vision devices at night or in other circumstances of darkness presents yet another problem for conventional eyeguards, especially when used under circumstances involving personal danger such as combat or law enforcement activities. When an enhanced vision device is being used, a light image is transmitted through the eyepiece. This image enters the eye of the user when he looks through the instrument. However, when the user moves his eye back from the eye-end of the instrument, the light image will continue being projected back through the end of the instrument, and is commonly seen as a bright spot or glow on the face of the user. This reflected light may serve to disclose the otherwise concealed position of a soldier or other concealed person. Conventional rim or cup type eyeguards provide little protection against the undesired escape of light from the eyepiece of an optical instrument. A need exists, therefore, for an eyeguard which automatically prevents the escape of light from the eyepieces of an optical instrument when it is not in use.

Eyeguards having an internal diaphragm which opens and closes automatically are known. Devices such as the CMI SB0525-A comprise a dome-shaped instrument portion, a cone-shaped forcing cone, with a segmented diaphragm there between. The dome shaped instrument-end was affixed to the eye-end of the optical instrument to be used. The diaphragm consists of a disk of material positioned within the dome shaped instrument portion of the eyeguard, such that the diaphragm extends perpendicularly across the line of sight through the optical instrument. A plurality of radial cuts are made in the diaphragm disk, resulting in a diaphragm comprising a plurality of wedge-shaped portions, each joined at its wide end to the interior of the dome-shaped instrument portion of the eyeguard. In its normal, relaxed state, the segments of the diaphragm will prevent dust, dirt or other contaminants from reaching the eye lens of the optical instrument. Similarly, the diaphragm will prevent the escape of light from the eye lens of the optical instrument. When the user positions the eyeguard against the periocular (i.e., around the eye) portion of his face and pushes towards the eye-end of the optical instrument, the forcing cone portion of the eyeguard will move forward, pushing against the back side of the diaphragm segments and, in turn, forcing them to move forward and outward, thus clearing a path for light to be transmitted through an opening in the center of the forcing cone. When the user removes his eye from the eyeguard, the natural resilience of the flexible eyeguard causes the forcing cone to return rearward to its original position and causes the diaphragm to close automatically, thus protecting the eye-end lens of the optical instrument from contamination, and preventing the passage or entry of light into the optical instrument. Prior art diaphragm-equipped eyeguards, such as the CMI SB0525-A, while addressing some of the problems of rim and cup type eyeguards, nevertheless have proven unsatisfactory for at least two reasons. First, excessive force was required to activate the diaphragm of prior art eyeguards. Some prior art eyeguards required the user to exert a force of 72 ounces to initially open the diaphragm and a force of 35 ounces to maintain the diaphragm in the open position. These values of force were unsatisfactory, as they tended to distort the vision of the user, and cause fatigue, eye strain or headaches during extended use. A need exists, therefore, for a diaphragm equipped eyeguard requiring low force levels to initially open the diaphragm and to maintain the diaphragm in the open position, yet which reliably closes when the user removes his eye from the eyeguard.

The second drawback with prior art diaphragm-equipped eyeguards is that excessive eye travel is required to fully open the diaphragm. For example, prior art eyeguards required from about 0.5 inch to about 0.75 inch travel to fully open the diaphragm. Eyeguards designed to allow such long travel sometimes prevented the user from achieving the proper eye relief, thus restricting the field of view through the optical instrument. A need exists, therefore, for a diaphragm-equipped eyeguard requiring reduced eye movement to fully open the diaphragm.

SUMMARY OF THE INVENTION

An object of the present invention is to provide an eyeguard which automatically protects an eye-end lens of an optical instrument from dirt, dust and airborne contaminants when not in use. Another object of the present invention is to provide an eyeguard which automatically prevents light from entering into or exiting from the eye-end lens of an optical instrument when not in use. A further object of the present invention is to provide an eyeguard which requires lower user eye force to activate. Yet another object of the current invention is to provide an eyeguard which requires reduced user eye movement to activate. A still further object of the current invention is to provide an eyeguard which can be molded as single piece of resilient material. Accordingly, the current invention provides a resilient eyeguard having an instrument-end member, an eye-end member, and a diaphragm located there between. The instrument-end member has a first portion adapted for connecting the eyeguard to the optical instrument and a second portion comprising a first flexible annular hinge. The eye-end member has a front portion comprising a second flexible annular hinge having a diameter less than that of the first flexible annular hinge and rear portion comprising a disk adapted to interface with the periocular region of the user's face which surrounds the eye. The diaphragm comprises a plurality of segments, each having a front side joined to the first flexible annular hinge and a rear side joined to the second flexible annular hinge. The diaphragm has a closed state and an open state, wherein when the diaphragm is in the closed state, the diaphragm segments are configured so as to block the passage of light rays through the eyepiece, whereas, when the diaphragm is in the open state, the diaphragm segments are configured so as to allow the passage of light rays through the eyepiece. By pressing the eye against the periocular pad, the user can cause relative motion between the instrument-end member and the eye-end member of the eyeguard such that the eyeguard will be deformed at the first and second annular hinge. This causes the diaphragm segments to move from a closed state to an open state as the user pushes forward on the periocular pad. When the user releases pressure from the periocular pad, the resilience of the hinge material causes the eye-end member to return to its original position such that the first and second annular hinges return to their original position and the diaphragm segments return to their normal closed position.

DETAILED DESCRIPTION

Figure 1A:
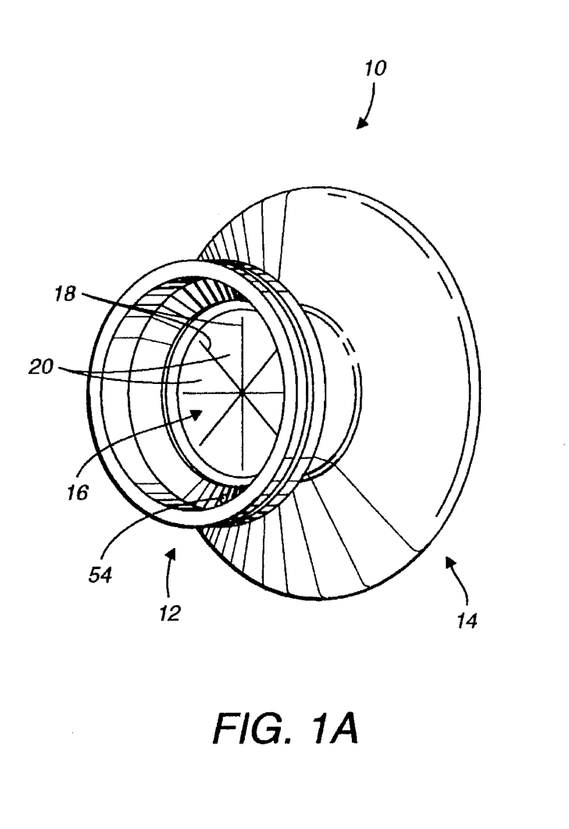
FIG. 1A is a perspective view showing the general appearance of an eyeguard according to the current invention when the diaphragm is in the closed position.
Figure 1B:
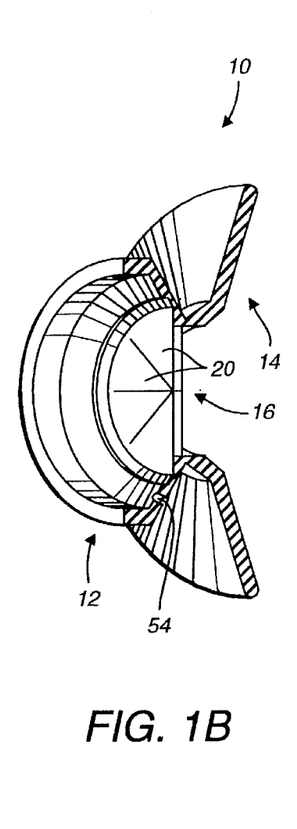
FIG. 1B is a perspective view, in cross-section, of the eyeguard in FIG. 1A.
Figure 1C:
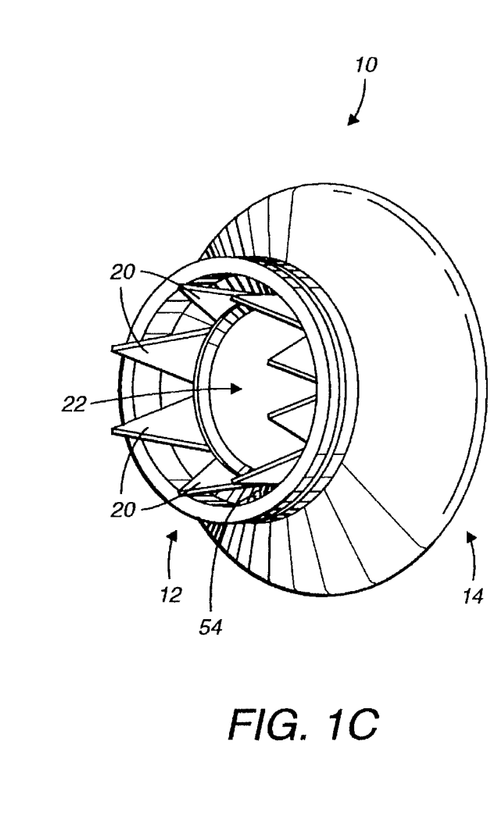
FIG. 1C is a perspective view showing the general appearance of an eyeguard according to the current invention when the diaphragm is in the open position.

Referring now to the drawings, wherein like reference numerals designate like or corresponding parts throughout the similar views and in particular to FIG. 1A, a perspective view is shown of an eyeguard 10 having an instrument-end member 12, an eye-end member 14, and a diaphragm 16. A plurality of segment lines 18 are cut through the diaphragm to form a plurality of diaphragm segments 20. In FIG. 1A, the diaphragm segments are in the closed position such that dirt and light cannot pass through the eyeguard. Referring now to FIG. 1B, the eyeguard 10 of FIG. 1A is shown in cross-section to further show the relationship between the instrument-end member 12, eye-end member 14, diaphragm 16 and diaphragm segments 20. In FIG. 1C, eye-end 14 has been pushed towards instrument-end member 12 such that diaphragm segments 20 have moved to the open position, thereby forming aperture 22 and allowing light to pass through eyeguard 10. FIGS. 1A, 1B, and 1C also show a vent hole 54 which may be formed in instrument-end member 12.

Figure 2A:
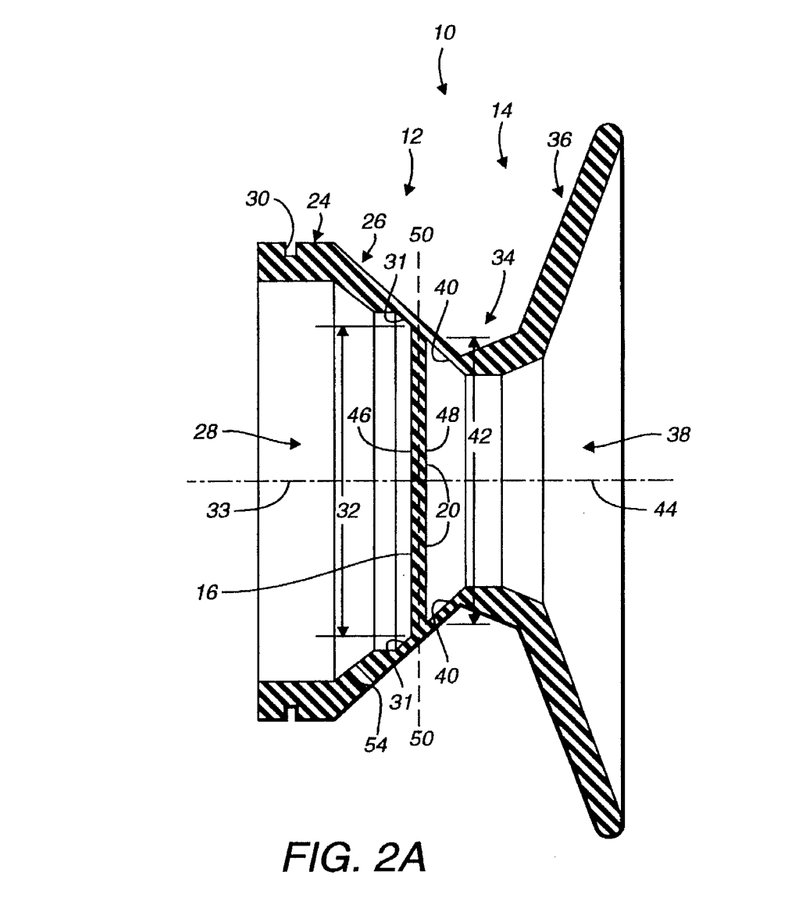
FIG. 2A is an elevation view, in cross-section, showing an eyeguard according to the current invention with the diaphragm in the closed position.
Figure 2B:
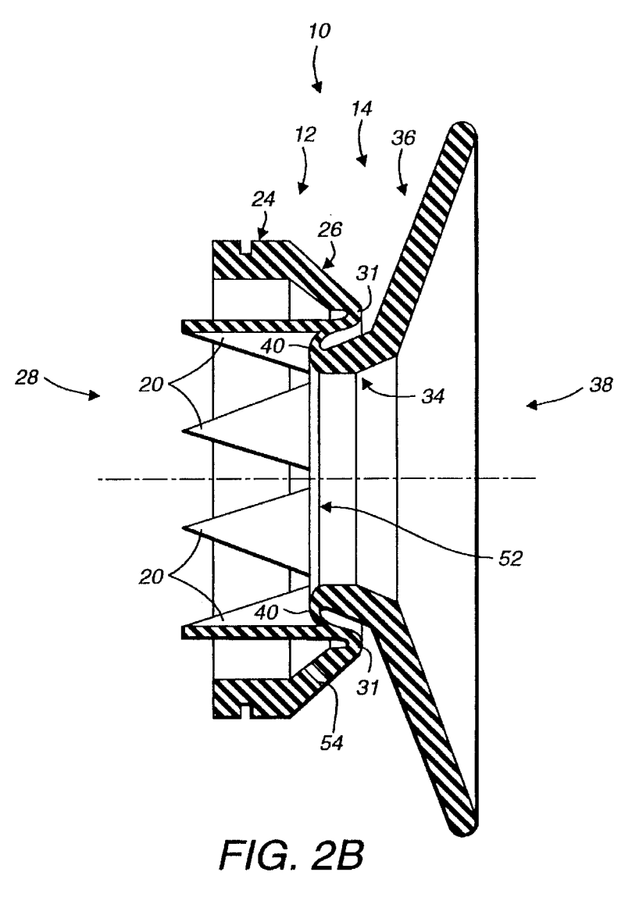
FIG. 2B shows the eyeguard of FIG. 2A with the diaphragm in the open position.

Referring now to FIGS. 2A and 2B, an eyeguard 10 according to the current invention is shown in cross-section, revealing instrument-end member 12, eye-end member 14 and diaphragm 16. Instrument-end member 12 has a first portion 24, a second portion 26 and a first passageway 28 therethrough. First portion 24 of instrument-end member 12 is adapted for connection to an optical instrument. This adaptation may take the form of an annular notch 30 designed to interface with a complementary feature on the optical instrument. Alternatively, first portion 24 of instrument-end member 12 may further comprise a rigid adapter such as a metallic ring, a polymer ring or other similar fitting so as to specifically adapt instrument-end member 12 for connection to the optical instrument of choice. Second portion 26 of instrument-end member 12 includes a first flexible annular hinge 31 having a first diameter 32. First passageway 28 of instrument-end member 12 has a first longitudinal axis 33 alignable with the optical path of the selected optical instrument. Eye-end member 14 has a third portion 34, a fourth portion 36 and a second passageway 38 therethrough. Third portion 34 includes a second flexible annular hinge 40 having a second diameter 42, said second diameter 42 being less than first diameter 32 of first annular hinge 31. Second passageway 38 of eye-end member 14 has a second longitudinal axis 44 generally aligned with first longitudinal axis 33 of instrument-end member 12. Fourth portion 36 of eye-end member 14 is adapted to interface with the periocular region (i.e., the region surrounding the eye) of the user's face. Accordingly, fourth portion 36 may be formed as an annular disc or conic section symmetrically aligned around second longitudinal axis 44. Alternatively, fourth portion 36 may take the form of a disc or conic section which is angled with relation to second longitudinal axis 44 to provide increased user comfort in certain situations. Further, fourth portion 36 may take the form of an irregularly shaped surface designed to interface with the facial structure of the user. Diaphragm 16 is disposed between instrument-end member 12 and eye-end member 14. Diaphragm 16 comprises a plurality of segments 20, each segment 20 having an instrument-end side 46 joined to first flexible annular hinge 31 and an eye-end side 48 joined to second flexible annular hinge 40. Each segment 20 is movable between a closed position and an open position. Referring specifically to FIG. 2A, diaphragm 16 is shown in a closed position, wherein segments 20 are disposed in a common plane 50 intersecting first and second longitudinal axes 33, 44, respectively, thereby blocking the passage of light rays between first passageway 28 and second passageway 38. Referring now to FIG. 2B, diaphragm 16 is shown in the open position, wherein segments 20 are positioned so as to allow the passage of light through aperture 52 between first passageway 28 and second passageway 38. The transition between the diaphragm closed position, shown in FIG. 2A, and the diaphragm open position, shown in FIG. 2B, is effected by means of a longitudinal movement of eye-end member 14 with respect to instrument-end member 12. Due to the size difference between first diameter 32 of first annular hinge 31 and second diameter 42 of second annular hinge 40, the relative motion of eye-end member 14 with respect to instrument-end member 12 causes second annular hinge 40 to move longitudinally through the annulus of first annular hinge 31, as shown in FIG. 2B. The deformation of annular hinges 31 and 40 caused diaphragm segments 20 to move into the open position as shown in FIG. 2B. When the user removes his eye from the eyeguard, the natural resilience of annular hinges 31 and 40 causes eye-end member 14 to move with respect to instrument-end member 12 until the closed position shown in FIG. 2A is again attained.

In a preferred embodiment, instrument-end member 12 has a vent hole 54 formed through the wall of second portion 26. When the eyeguard 10 is connected to an optical instrument at one end and the user has his eye pressed against the other, vent hole 54 will allow air to escape or enter the eyeguard so as to prevent the formation of significant pressure or vacuum within the eyeguard which could cause discomfort or injury to the user. This is especially important when sudden movement such as the recoil of a weapon may cause the eyeguard to be rapidly and forcefully pressed against the user's eye and then released. Vent hole 54 also allows fresh air to enter the eyeguard and circulate around the eye during use to minimize perspiration or fogging which could adversely affect the vision of the user.

In a more preferred embodiment, vent hole 54 has a diameter within the range of about 0.05 inch to about 0.12 inch. The escape or entry of light from a hole of such size is negligible, thus it does not adversely affect the operation of the eyeguard. Those skilled in the art will recognize that vent hole 54 may be located in other positions on the eyeguard, provided the hole is not blocked by attachment to the optical instrument or by folding of the eyeguard during use.

While in the preferred embodiment, an eyeguard according to the current invention consists of a single piece of molded elastomer, those skilled in the art will recognize that additional embodiments are within the scope of this invention. For example, some applications may require that portions of the instrument-end member and/or eye-end member be formed of rigid or semi-rigid materials. In such cases, first and second annular hinges 31 and 40, respectively, may each comprise molded elastomer which is then connected through adhesives, thermal bonding, or other processes to the rigid or semi-rigid components of the eyeguard. In yet another embodiment, the eyeguard would comprise a diaphragm assembly comprising first and second annular hinges and a diaphragm, where this diaphragm assembly consists of a single piece of molded elastomer which may then be affixed with adhesive, thermal bonding or other methods to the other components of the eyeguard.

When an eyeguard, according to the current invention, has its diaphragm in the closed position, the user must provide a force having a first value to the eye-end member 14 of the eyeguard in a direction toward the instrument-end member 12 to cause the second annular hinge 40 to move through the annulus of the first annular hinge 31 such that diaphragm segments 20 move into the open position. In a preferred embodiment of the current invention, the first value of force required to open the diaphragm is in the range of about 0.11 lb. to about 4.0 lbs. In a more preferred embodiment, this first value in the range of about 0.13 lb. to about 1.3 lbs. In a most preferred embodiment, this first value is in the range of about 0.16 lb. to about 0.5 lb. When the diaphragm segments 20 are in the open position, the user must supply a force having a second value to the eye-end member 14 of eyeguard 10 in a direction toward instrument-end member 12 to cause the second annular hinge 40 to maintain its position relative to first annular hinge 31 such that diaphragm segments 20 remain in the open position. This second value is less than the first value necessary to initially open the diaphragm. In a preferred embodiment of the current invention, the second value necessary to maintain the diaphragm in the open position is in the range of about 0.1 lb. to about 2.0 lbs. In a more preferred embodiment, this second value is in the range of about 0.12 lb. to about 0.56 lb. In a most preferred embodiment, the second value of force necessary to maintain the diaphragm in the open position is in the range of about 0.15 lb. to about 0.25 lb. When a force having a value less than the second value necessary to maintain the diaphragm in the open position is applied to the eye-end member 14 of eyeguard 10 in a direction toward instrument-end member 12, second annular hinge 40 will be positioned relative to first annular hinge 31 such that diaphragm segments 20 will be in the closed position.

Figure 3:
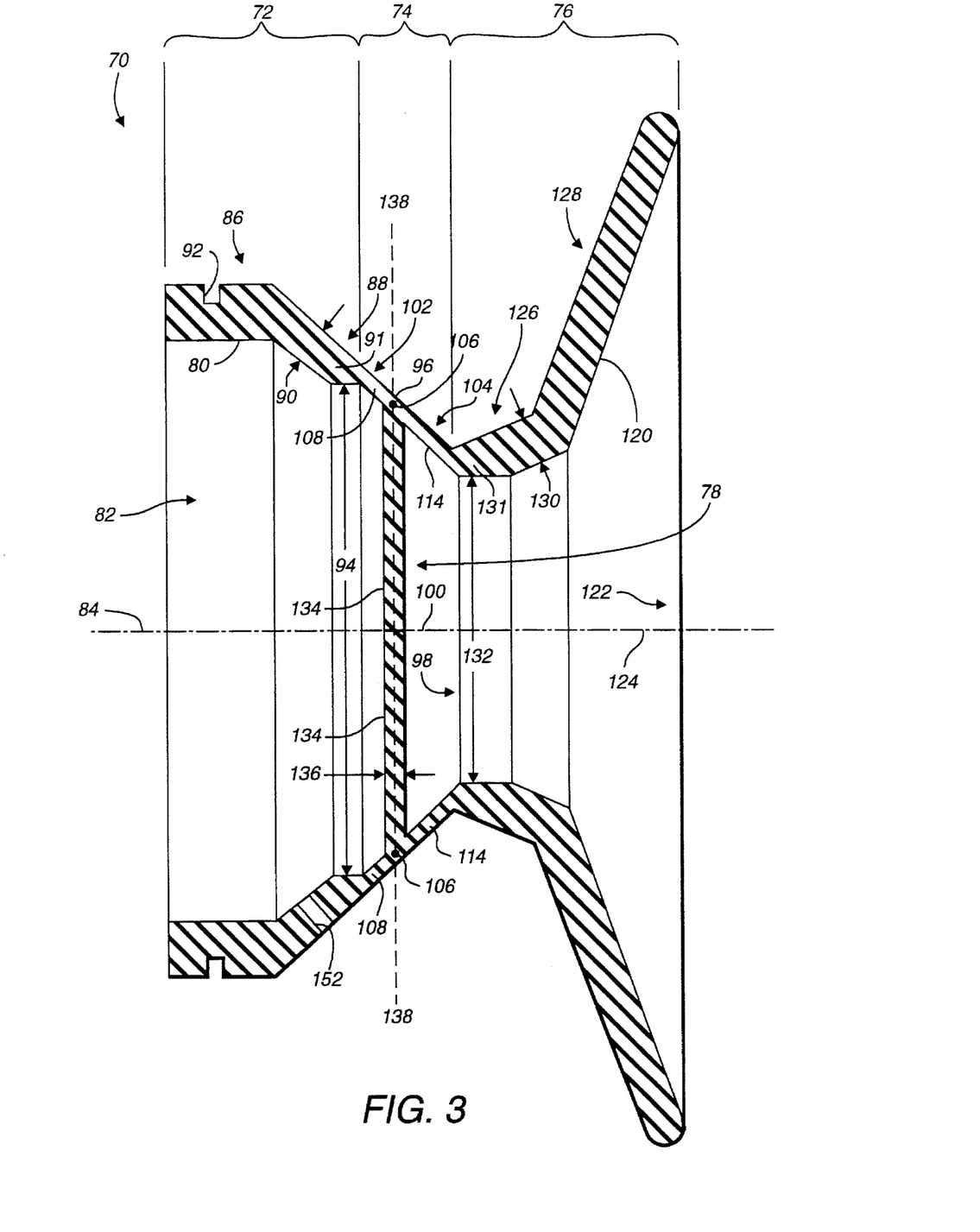
FIG. 3 is an elevation view, in cross-section showing an alternative embodiment of an eyeguard according to the current invention with the diaphragm in the closed position.
Figure 4:
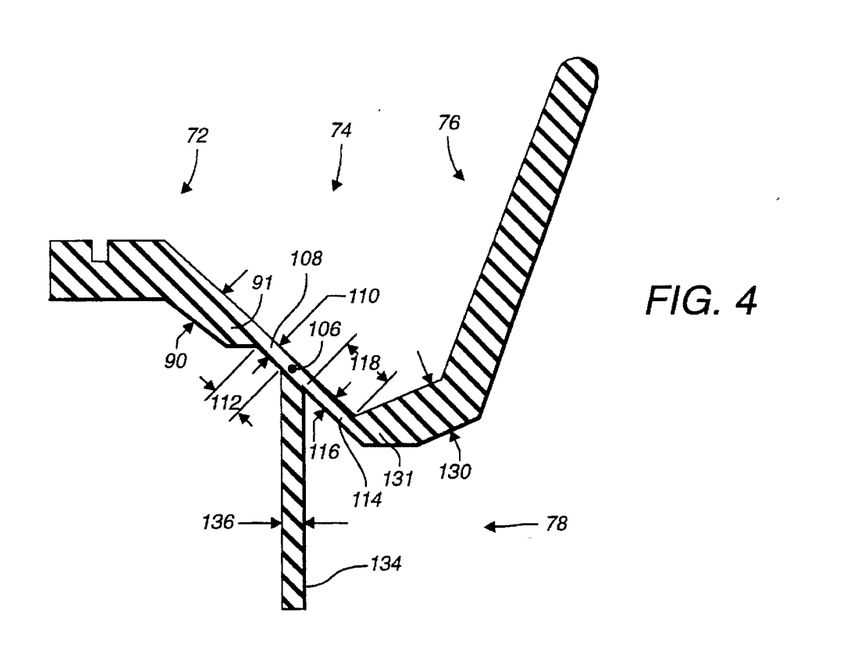
FIG. 4 is an enlarged view of a cross-section of the eyeguard in FIG. 3, showing the structure surrounding the hinge member in greater detail.
Figure 5:
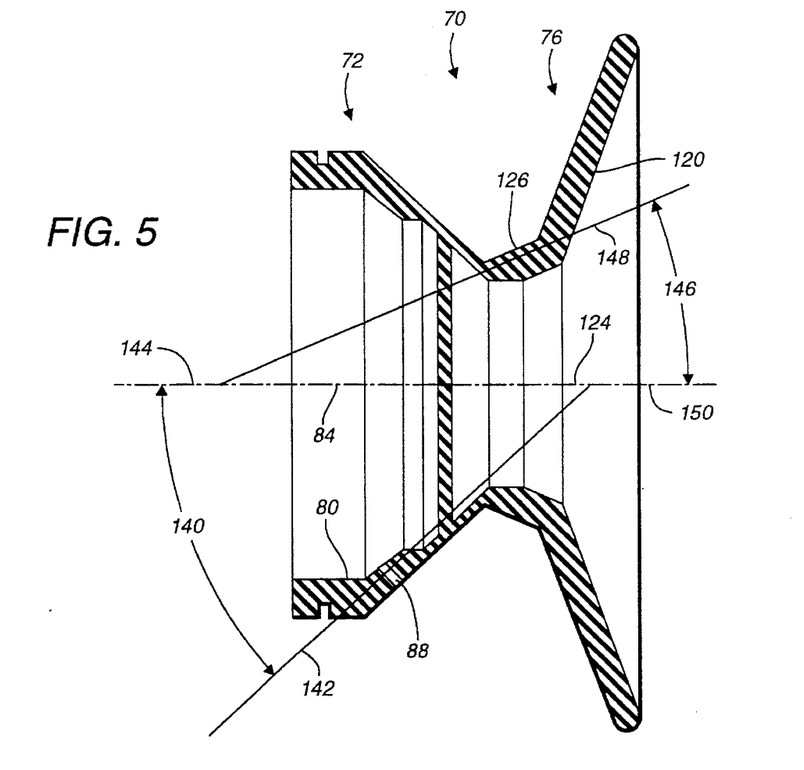
FIG. 5 is a view of the eyeguard of FIG. 3 showing angles constituting an important aspect of the current invention.

To achieve the preferred values for the force necessary to open the diaphragm or to maintain the diaphragm in the open position, numerous aspects of the structure of the eyeguard must be considered. Referring now to FIGS. 3, 4 and 5, an eyeguard 70 according to the present invention is shown comprising an instrument-end member 72, a hinge member 74, an eye-end member 76 and a diaphragm 78. Instrument-end member 72 has a first continuous side wall 80 and a first passage 82 therethrough. First passage 82 has a first longitudinal axis 84. First side wall 80 includes first and second annular end portions 86, 88, respectively, and has a first principal side wall thickness 90, which is the thickness of the main portion of first side wall 80 in the vicinity of the second annular end portion 88 but not including transition section 91. First end portion 86 of first side wall 80 is adapted for connection to the selected optical instrument. Accordingly, first end portion 86 may comprise an annular notch 92 sized to interface with a corresponding feature on the selected optical instrument. Alternately, first end portion 86 may comprise a rigid adapter such as a metallic ring, polymer ring or other fitting designed to interface with the selected optical instrument. Second end portion 88 of first side wall 80 has a second end diameter 94. First side wall 80 may also have a vent hole 152 formed therethrough to allow the passage of air between the interior and exterior of the eyeguard during use as previously discussed. In a preferred embodiment, vent hole 152 is located in second end portion 88 of first side wall 80, however, one skilled in the art would realize that other positions would be encompassed by the current invention. Hinge member 74 has a second continuous side wall 96 and a second passage 98 therethrough. Second passage 98 has a second longitudinal axis 100 generally collinear with first longitudinal axis 84. Second side wall 96 includes third and fourth annular end portions 102, 104, respectively, and has an annular diaphragm attachment line 106 located along said second passage 98 between said third and fourth end portions. Second side wall 96 has a first annular hinge portion 108 disposed between third end portion 102 and diaphragm attachment line 106. Referring now specifically to FIG. 4, first hinge portion 108 has a first hinge thickness 110 and a first hinge length 112. Referring back generally to FIGS. 3 and 4, second side wall 96 of hinge member 74 has a second annular hinge portion 114 disposed between diaphragm attachment line 106 and fourth end portion 104. Referring again to FIG. 4, second hinge portion 114 has a second hinge thickness 116 and a second hinge length 118. Referring back generally to FIGS. 3 and 4, third end portion 102 of hinge member 74 is continuously joined to second end portion 88 of instrument-end member 72. Eye-end member 76 has a third continuous side wall 120 and a third passage 122 therethrough. Third passage 122 has a third longitudinal axis 124 generally collinear with first and second longitudinal axes 84 and 100, respectively. Third side wall 120 includes fifth and sixth annular end portions 126, 128, respectively, and has a second principal wall thickness 130, i.e., the thickness of the main portion of third side wall 120 away from transition sections such as 131. Fifth end portion 126 of third side wall 120 has a fifth end diameter 132, said fifth end diameter being smaller and than second end diameter 94 of second end portion 88. Fifth end portion 126 is continuously joined to fourth end portion 104 of hinge member 74. Sixth end portion 128 of third wall 120 is adapted to interface with the periocular area of the user's face. Accordingly, sixth end portion 128 may take the form of a symmetrical or asymmetrical disc or conic section arranged either symmetrically or asymmetrically with respect to third longitudinal axis 124 of eye-end member 76. Diaphragm 78 comprises a plurality of diaphragm segments 134. Each segment 134 has a diaphragm thickness 136 and is joined to hinge member 74 along annular diaphragm attachment line 106. Each segment 134 is movable between a closed position and an open position, wherein in the closed position, segments 134 are disposed in a common plane 138 intersecting second side wall 96 along diaphragm attachment line 106 thereby blocking the passage of light rays through second passage 98, and wherein in the open position, segments 134 are positioned so as to allow the passage of light through second passage 98. The transition between the open position and the closed position is effected by means of the movement of eye-end member 76 with respect to instrument-end member 72 along a line generally collinear with the first, second and third longitudinal axes 84, 100 and 124, respectively.

Among important aspects of the current invention are the thicknesses of the first and second annular hinge portions 108 and 114, respectively. If the thickness of the hinges is too low, the eyeguard is very slow to close or may not close reliably. If the thickness is too large, the force required to open the diaphragm or maintain it in the open position becomes unacceptably high. Proper selection of the thickness for the annular hinges results in an instantaneous closing of the diaphragm when the user pulls back from the eyeguard, thus not allowing any light to hit his body and give away his position to the enemy. In addition, proper closing will keep light from entering the optical instrument and damaging sensitive coatings or tubes. In a preferred embodiment of the current invention, the value of the first hinge thickness 110 is less than 50% of a value of first principal wall thickness 90 of instrument-end member 72, and the value of second hinge thickness 116 is less than 50% of the value of second principle wall thickness 130 of eye-end member 76. In a more preferred embodiment, first thickness 110 of first hinge portion 108 is within the range of about 0.03 inch to about 0.06 inch and second thickness 116 of second hinge portion 114 is within the range of about 0.03 inch to about 0.06 inch.

Another aspect important to the current invention is the value of length 112 of first hinge portion 108. This value controls how far down the eyeguard collapses when a force is applied to eye-end member 76 in the direction of instrument-end member 72. In a preferred embodiment, the value of length 112 of first hinge portion 108 is at least equal to the value of diaphragm thickness 136.

Yet another important aspect of the current invention is the thickness of the diaphragm. If the diaphragm is too thin, it is not rigid enough to fully close and may allow light to pass either in or out of the optical instrument. If the diaphragm is too thick, additional material must be added in annular hinge portions 108 and 114 to support the diaphragm. In a preferred embodiment, the thickness 136 of diaphragm 78 is within the range of about 0.04 inch to about 0.08 inch.

Still another important aspect of the current invention is the length of the second hinge portion. If the value of length 118 of second hinge portion 114 is too small, diaphragm segments 134 will not fully open for a clear view. In a preferred embodiment of the current invention, second length 118 of second hinge portion 114 is at least about 0.1 inch.

Yet another important aspect of the current invention is the relationship between certain angles found in instrument-end member 72 and eye-end member 76. Referring now to FIG. 5, a first angle 140 is formed by the intersection of a first line 142 constituting an extension of second end portion 88 of first side wall 80 of instrument-end member 72 and a second line 144 constituting an extension of first longitudinal axis 84 of instrument-end member 72, both first and second lines 142 and 144, respectively, being in a first plane containing first longitudinal axis 84. A second angle 146 is formed the by intersection of a third line 148 constituting an extension of fifth end portion 126 of third side wall 120 of eye-end member 76 and a fourth line 150 constituting an extension of third longitudinal axis 124 of eye-end member 76, both third and fourth lines 148, 150, respectively, being in a second plane containing third longitudinal axis 124. For eye-end member 76 to fit within instrument-end member 72 as the eyeguard collapses, first angle 140 must be greater than second angle 146. In a preferred embodiment of the current invention, first angle 140 is at least 10° greater than second angle 146. In a more preferred embodiment of the current invention, first angle 140 is in the range of about 40° to about 48°. In a most preferred embodiment, second angle 146 is in the range of about 28° to about 36°.

Still another important aspect of the current invention is the value of the predetermined distance which eye-end member 76 must move toward instrument-end member 72 to effect a change in the configuration of the diaphragm 78 from the closed position to the open position. In a preferred embodiment of the current invention, the value of the predetermined distance is in the range of about 0.1 inch to about 0.5 inch. In a more preferred embodiment, the value of the predetermined distance is in the range of about 0.15 inch to about 0.30 inch.

Reverting now to our invention broadly, it will be seen that it accomplishes the objective of providing an eyeguard which automatically protects an eye-end lens of an optical instrument from dirt, dust and airborne contaminants when not in use. An eyeguard in accordance with the current invention further accomplishes the objective of providing an eyeguard which automatically prevents light from entering into or exiting from the eye-end lens of an optical instrument when not in use. The present invention also provides an eyeguard which requires lower user force to activate and which requires reduced user movement to activate. An eyeguard according to the current invention further provides an eyeguard which can be molded as a single piece of resilient material.

We wish it to be understood that we do not desire to be limited to the exact details of construction shown and described, for obvious modifications will occur to a person skilled in the art.

I claim:

1. An eyeguard for use with an optical instrument by a person, said eyeguard comprising:

an instrument-end member, a hinge member, an eye-end member, and a diaphragm;

a) said instrument-end member having a first continuous side wall and a first passage therethrough;

said first passage having a first longitudinal axis;

said first side wall including first and second annular end portions and having a first principal wall thickness;

said first end portion being adapted for connection to said optical instrument; said second end portion being connected to said hinge member and having a second end diameter;

b) said hinge member being connected between said instrument-end member and said eye-end member and having a second continuous side wall and a second passage therethrough;

said second passage having a second longitudinal axis generally collinear with said first longitudinal axis;

said second side wall including third and fourth annular end portions and having an annular diaphragm attachment line located along said second passage between said third and fourth end portions;

said third end portion being connected to said second end portion of said instrument-end member;

said fourth end portion being connected to said eye-end member;

said second side wall having a first annular hinge portion disposed between said third end portion and said diaphragm attachment line;

said first hinge portion having a first hinge thickness and a first hinge length;

said second side wall having a second annular hinge portion disposed between said diaphragm attachment line and said fourth end portion;

said second hinge portion having a second hinge thickness and a second hinge length;

c) said eye-end member being connected to said fourth end portion of said hinge member and having a third continuous side wall and a third passage therethrough;

said third passage having a third longitudinal axis generally collinear with said first and second longitudinal axes;

said third side wall including fifth and sixth annular end portions and having a second principal wall thickness;

said fifth end portion being connected to said fourth end portion of said hinge member and having a fifth end diameter, said fifth end diameter being smaller than said second end diameter of said second end portion;

said sixth end portion adapted to interface with a periocular area of the person's face;

d) said first hinge thickness being reduced in comparison to said first principal wall thickness, and said second hinge thickness being reduced in comparison to said second principal wall thickness, to elastically bend said second side wall at said hinge portions upon longitudinal relative movement of said eye-end member toward said instrument-end member; and e) said diaphragm comprising a plurality of segments connected to a region of said second side wall of said hinge member facing said second passage along said annular diaphragm attachment line;

each of said segments having a diaphragm thickness;

said segments being movable between a closed position, when said second side wall is not elastically bent at said hinge portions, and an open position, when said second side wall is elastically bent at said hinge portions to position said second hinge portion longitudinally between said first end portion of said instrument-end member and said first hinge portion;

wherein, when in said closed position, said segments are disposed in a common plane intersecting said second side wall along said diaphragm attachment line, thereby blocking the passage of light rays through said second passage; and wherein, when in said open position, said segments are disposed outwardly from said second longitudinal axis in a non-planar array to allow the passage of light rays through said second passage.

2. The eyeguard of claim 1, wherein a value of said first hinge thickness is less than 50% of a value of the first principal wall thickness of said instrument-end member, and a value of said second hinge thickness is less than 50% of a value of the second principal wall thickness of said eye-end member.

3. The eyeguard of claim 1, wherein said first hinge thickness is within the range of about 0.03 inch to about 0.06 inch and said second hinge thickness is within the range of about 0.03 inch to about 0.06 inch.

4. The eyeguard of claim 1, wherein a value of said first hinge length is at least equal to a value of said diaphragm thickness.

5. The eyeguard of claim 1, wherein said diaphragm thickness is within the range of about 0.04 inch to about 0.08 inch.

6. The eyeguard of claim 1, wherein said second hinge length is at least about 0.1 inch.

7. The eyeguard of claim 1, further comprising:

a first angle being defined by the intersection of a first line constituting an extension of the exterior surface of said second end portion of said first side wall of said instrument-end member and a second line constituting an extension of said first longitudinal axis of said instrument-end member, both said first and second lines being in a first plane containing the first longitudinal axis; and a second angle being defined by the intersection of a third line constituting an extension of the exterior surface of said fifth end portion of said third side wall of said eye-end member and a fourth line constituting an extension of said third longitudinal axis of said eye-end member, both said third and fourth lines being in a second plane containing the third longitudinal axis; and wherein said first angle is at least 10° greater than said second angle.

8. The eyeguard of claim 7, wherein said first angle is in the range of about 40° to about 48°.

9. The eyeguard of claim 8, wherein said second angle is in the range of about 28° to about 36°.

10. The eyeguard of claim 1, wherein said first continuous side wall has a vent hole formed therethrough.

11. An eyeguard comprising:

an instrument-end member, a hinge member, an eye-end member, and a diaphragm;

a) said instrument-end member being adapted for attachment to an instrument and including a generally annular first side wall defining a first longitudinal passage and a principal wall thickness;

b) said hinge member being connected between said instrument-end member and said eye-end member and including a generally annular second side wall defining a second longitudinal passage generally aligned with said first passage and having a first hinge and a second hinge;

said first hinge being generally annular and being defined by a region of said second side wall proximate said instrument-end member and having a first hinge thickness;

said second hinge being generally annular and being defined by a region of said second side wall proximate said eye-end member and having a second hinge thickness;

c) said eye-end member being connected to said hinge member, including a generally annular third side wall defining a third longitudinal passage generally aligned with said second passage and defining a principal wall thickness, and being adapted for contact around an eye of a user's face;

d) said first hinge thickness being reduced in comparison to said principal wall thickness of said instrument-end member, and said second hinge thickness being reduced in comparison to said principal wall thickness of said eye-end member, to elastically bend said second side wall at said hinges upon longitudinal relative movement of said eye-end member toward said instrument-end member; e) said diaphragm comprising a plurality of segments;

each of said diaphragm segments being connected to said hinge member along an annular region of said second side wall facing said second passage and disposed between said first hinge and said second hinge;

said diaphragm segments being disposed in a common plane, when said second side wall is not elastically bent at said hinges, thereby blocking the passage of light between said first passage and said third passage; and said diaphragm segments being disposed in a non-planar array, when said second side wall is elastically bent at said hinges, thereby allowing the passage of light between said first passage and said third passage.

12. The eyeguard of claim 11 wherein said eyeguard consists of a single piece of molded elastomer.

13. The eyeguard of claim 11, wherein the value of said first hinge thickness is less than about 50% of the value of said principal wall thickness of said instrument-end member, and the value of said second hinge thickness is less than about 50% of the value of said principal wall thickness of said eye-end member.

14. The eyeguard of claim 13, wherein said first principal wall thickness has as value greater than about 0.06 inches and said first hinge thickness is within the range of about 0.02 inches to about 0.03 inches.

15. The eyeguard of claim 13, wherein said second principal wall thickness has as value greater than about 0.06 inches and said second hinge thickness is within the range of about 0.02 inches to about 0.03 inches.

16. The eyeguard of claim 11, wherein said reduced thicknesses of said hinges in comparison to said respective principal wall thicknesses are adapted to longitudinally move said eye-end member toward said instrument-end member and to elastically bend said second side wall at said hinges to reverse the relative longitudinal positions of said first and second hinges in comparison to the relative longitudinal positions of said first and second hinges when said second side wall is not elastically bent at said hinges, upon the application to said eye-end member of a longitudinal force having a first value directed toward said instrument end, said first value being within the range of about 0.11 pounds to about 4.0 pounds.

17. The eyeguard of claim 16, wherein said first value of force is within the range of about 0.13 pounds to about 1.3 pounds.

18. The eyeguard of claim 17, wherein said first value of force is within the range of about 0.16 pounds to about 0.5 pounds.

19. The eyeguard of claim 11, wherein said reduced thicknesses of said hinges in comparison to said respective principal wall thicknesses are adapted to maintain the relative longitudinal position of said eye-end member to said instrument-end member and to maintain said second side wall in a configuration elastically bent at said hinges, upon the application to said eye-end member of a longitudinal force having a second value directed toward said instrument-end member.

20. The eyeguard of claim 19, wherein said second value is within the range of about 0.1 pounds to about 2.0 pounds.

21. The eyeguard of claim 20, wherein said second value is within the range of about 0.12 pounds to about 0.56 pounds.

22. The eyeguard of claim 21, wherein said second value is within the range of about 0.15 pounds to about 0.25 pounds.

23. The eyeguard of claim 19, wherein said reduced thicknesses of said hinges in comparison to said respective principal wall thicknesses are adapted to return said second side wall to a configuration not elastically bent at said hinges, upon application to said eye-end member of a longitudinal force less than said second value directed toward said instrument-end member.

24. The eyeguard of claim 11, wherein said instrument-end member further comprises a vent hole intersecting said first passageway.

25. An eyeguard comprising:

an instrument-end member, a hinge member, an eye-end member, and a diaphragm;
 a) said instrument-end member being adapted for attachment to an instrument and including a generally annular first side wall defining a first longitudinal passage having a first longitudinal axis, a first principal wall thickness, and a first inner end diameter;
 b) said hinge member being connected between said instrument-end member and said eye-end member, including a generally annular second side wall defining a second longitudinal passage having a second longitudinal axis generally aligned with said first longitudinal axis, and having a first hinge and a second hinge;
  said first hinge being generally annular, being defined by a region of said second side wall disposed proximate said instrument-end member, and having a first hinge thickness and a first hinge length;
  said second hinge being generally annular, being defined by a region of said second side wall disposed between said first hinge and said eye-end member, and having a second hinge thickness and a second hinge length;
 c) said eye-end member being connected to said hinge member, including a generally annular third side wall defining a third longitudinal passage having a third longitudinal axis generally aligned with said second longitudinal axis, a second principal wall thickness, and an second inner end diameter; said second inner end diameter being smaller than said first inner end diameter; said eye-end member being adapted for contact around an eye of a user's face;
 d) said first hinge thickness being reduced in comparison to said first principal wall thickness and said second hinge thickness being reduced in comparison to said second principal wall thickness of said eye-end member to elastically bend said second side wall at said hinges upon longitudinal relative movement of said eye-end member toward said instrument-end member;
 e) said first and second hinge lengths defining a maximum extent of longitudinal relative movement of said eye-end member toward said instrument-end member, when said second side-wall is elastically bent at said hinges;
 f) said diaphragm comprising a plurality of segments;
  each of said diaphragm segments being connected to said hinge member along an annular region of said second side wall facing said second passage and disposed between said first hinge and said second hinge;
  said diaphragm segments being disposed in a common plane blocking the passage of light between said first passage and said third passage, when said second side wall is not elastically bent at said hinges; and
  said diaphragm segments being disposed in a non-planar array allowing the passage of light between said first passage and said third passage, when said second side wall is elastically bent at said hinges.

26. The eyeguard of claim 25, wherein said first and second hinge lengths are adapted to define a maximum extent of longitudinal relative movement of said eye-end member toward said instrument-end member when said second side-wall is elastically bent at said hinges, said maximum extent being within the range of about 0.1 inches to about 0.5 inches.

27. The eyeguard of claim 21, wherein said maximum extent is of longitudinal relative movement is within the range of about 0.15 inches to about 0.3 inches.

* * * * *